United States Patent Office 3,269,200
Patented August 30, 1966

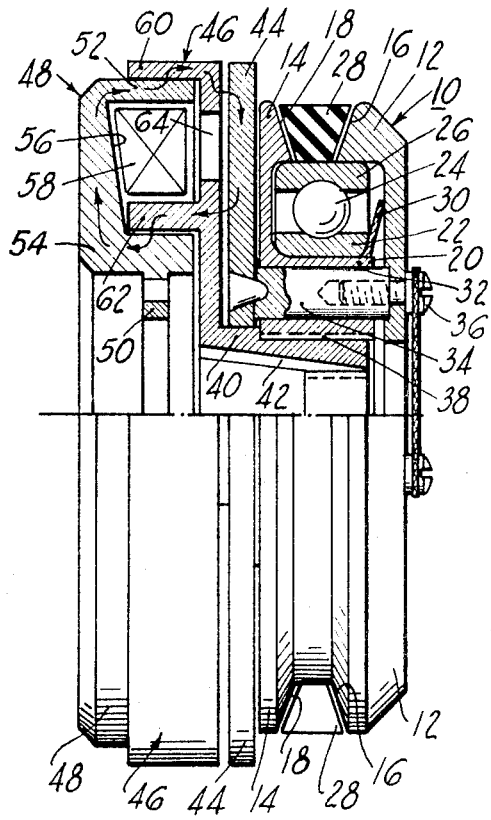
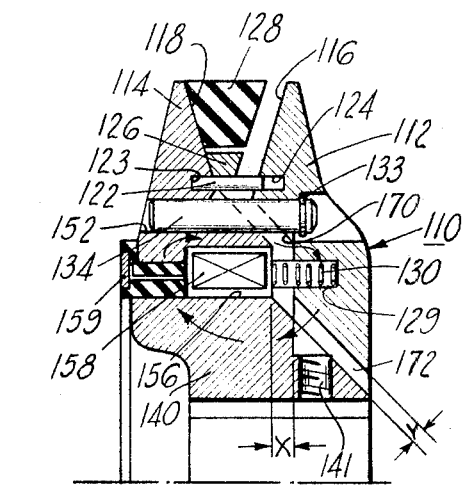
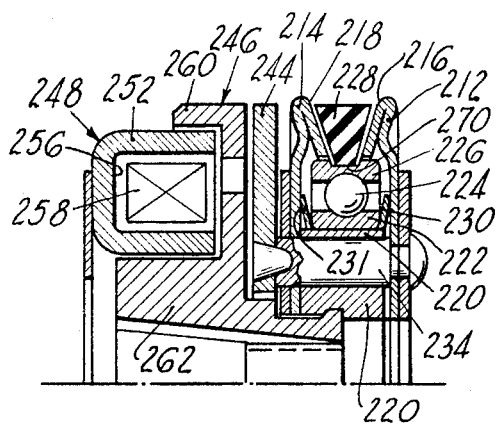
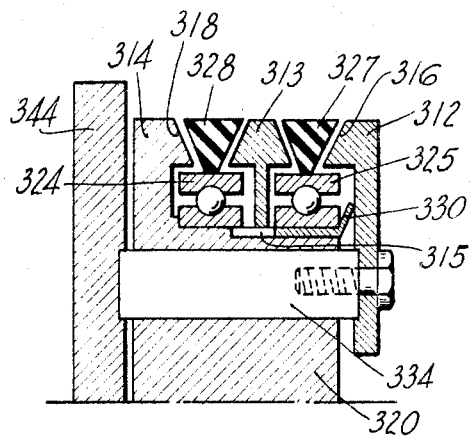
INVENTORS
DAVID S. VAUGHAN
CHARLES A. MENDENHALL
BY
William S Thompson
ATTORNEY

3,269,200
BELT ENGAGING PULLEY
David S. Vaughn and Charles A. Mendenhall, both of Horseheads, N.Y., assignors to The Bendix Corporation, Eclipse Machine Division, Elmira, N.Y., a corporation of Delaware
Filed May 13, 1964, Ser. No. 367,013
10 Claims. (Cl. 74—230.17)

The present invention relates to a belt engaging clutch device, and more particularly to a clutch device having a split drive belt pulley directly clamping a drive belt for clutch engagement.

It is an object of the present invention to provide a clutch device operative with a belt drive having axially moveable pulley segments for directly clamping a drive belt for clutch engagement.

It is another object of the present invention to provide a belt engaging clutch having electro-magnetic actuation means.

It is a further object of the present invention to provide a belt engaging clutch providing free relatively frictionless rotation of the drive belt when the clutch is disengaged.

It is a still further object of the present invention to provide an electro-magnetically actuated belt engaging clutch having improved means for minimizing the magnetic flux air gap.

Other objects and advantages of the present invention will become apparent on consideration of the description and accompanying drawings wherein:

FIGURE 1 is an elevation view, partly in section, of a first embodiment of our clutch device characterized by a fixed coil carrying member;

FIGURE 2 is a partial section view of a second embodiment of the invention wherein the coil is mounted in a rotatable pulley member;

FIGURE 3 is another partial section view of a third embodiment of the invention having axially moveable bearing means; and FIGURE 4 is a partial section view of a fourth embodiment of the invention for use with a plurality of drive belts.

Referring to the first embodiment of our invention illustrated in FIGURE 1, the clutch device is comprised of a rotatable pulley member generally designated by the numeral 10 having split or separate pulley segments or halves 12 and 14, each half having an inclined surface 16 and 18 respectively, which cooperatively form the sidewalls of a drive belt groove. Pulley half 14 contains an axially extending annular projection 20 which at its outer circumference forms a support for the inner race 22 of the ball bearing 24 which is thereby located intermediate the two pulley halves. Bearing 24 has an annular outer race 26 which forms the base or inner surface of the drive belt groove. A V-belt 28, illustrated in section in the upper half of FIGURE 1, interfits in the groove defined by pulley half surfaces 16 and 18 and the annular bearing member 26 and in the position illustrated bears directly against the bearing member 26 and is spaced from the surfaces 16 and 18. An annular wave washer spring member 30 is interposed between the pulley halves having one end bearing against pulley half 12 and the other end bearing against the inner race 22 of bearing 24 to urge the pulley halves axially apart in a belt disengaged position.

The annular projection 20 of pulley half 14 has a plurality of axially extending drilled holes, one of which is designated by numeral 32 in which there is slidably mounted an axially extending rod member 34 which is secured to pulley half 12 by screws 36. The rod and hole connection 32 and 34 between pulley halves provides a splined connection whereby the pulley halves will rotate as a unit and yet are capable of relative axial movement.

At the radially innermost edge of annular projection 20 there is provided a spline connection 38 with an axially extending hub member 40. The hub member 40 has on its radially innermost edge a keyway connection 42 adapted to be connected to an output drive shaft to which it is desired to transmit torque from drive belt 28.

A first annular ferrous disc member 44 is rigidly secured to the rods 34 as by welding or the like and is thereby rotational with the pulley 10 and axially moveable with the pulley half 12. Annular disc 44 is spaced closely adjacent pulley half 14 and is operative to abut said pulley half under the influence of spring 30 to define the maximum spacing between pulley groove surfaces 16 and 18. A second annular ferrous disc member 46 is formed as a continuation of hub 40 and thus is rotatable with the combined pulley assembly 10, however, unlike annular disc 44 the disc 46 is axially fixed by its connection to hub 40 to the drive shaft. Immediately adjacent the annular disc 46 there is formed an annular fixed carrier member 48 which is adapted to be rigidly secured to the frame member or the like by means of bolt holes 50 provided on its radially inner edge. Fixed carrier member 48 has a pair of axially extending radially spaced annular walls or projections 52 and 54, respectively, which define an annular recess 56 in which there is mounted an electromagnetic coil 58. The axially fixed annular disc member 46 has a pair of complementary axially extending annular projections 60 and 62 which are closely spaced relative to the projections 52 and 54 of the fixed carrier 48. Axially aligned with the coil 58 disc 46 contains an opening 64 to control the electromagnetic coil flux path as will be later described.

In operation, when coil 58 is de-energized spring 30 extends the pulley halves 12 and 14 axially apart approximately as illustrated in FIGURE 1 whereby the V-belt 28 rotates freely with outer race member 26 and does not transmit any torque to an output shaft. On electrical actuation of the magnetic coil 58 magnetic flux follows a path indicated by the arrows providing a magnetic force tending to attract axially moveable ferrous disc member 44 in an axial direction overcoming the force of spring 30 and moving the surface 16 of the V-belt groove closer to surface 18 squeezing belt 28. Opening 64 provides a radial air gap in member 46 so that magnetic flux will cross the axial air gap separating members 44 and 46, causing magnetic flux to flow in disc member 44. As surface 16 of the V-belt groove is moved closer to surface 18, the amount of torque which can be carried by the clutch can be varied by controlling the amount of magnet flux which can control the amount of squeezing on belt 28. Torque is then directly transmitted from belt 28 to the pulley halves 12 and 14 through spline connections 38 to hub 40 and the output shaft.

Referring now to FIGURE 2, there is shown a pulley device generally indicated by numeral 110 comprised of a pair of pulley segments or halves 112 and 114, each having a surface 116 and 118 respectively forming one side each of a drive belt groove. The inner base surface of a drive belt groove is formed by an annular bearing member 126 which is slidably mounted on ring 122 as a bearing support. Inner ring member 122 is secured in the slot 123 formed in the pulley half 114 and extends at its other end loosely into the slot 124 formed in the pulley half 112.

The pulley halves are splined together by an axially extending pin 134 slidably fitting in the hole 152 formed in pulley half 114 and secured by snap ring connection 133 to the pulley half 112. A recess 129 is formed in pulley half 112 and contains a compression coil spring member 130 which bears against pulley half 114 providing a force separating the pulley halves in their normally released position. An annular recess 156 is formed in the pulley half 114 and contains the electromagnetic coil 158 which is adapted to be connected to the electrical slip ring connection 159 to receive an actuating signal. Pulley half 114 contains an inner hub 140 having a threaded opening 141 for receiving a set screw or the like adapted to connect the hub for driving relationship to an output shaft. Immediately radially outwardly and radially inwardly of the coil 158 the pulley halves have inclined conforming surfaces 170 and 172 defining the air gap in a magnetic flux path generally indicated by the arrows.

When no actuation signal is applied, compression spring member 130 provides a separation force urging the pulley halves axially apart in a belt release position whereby V-belt 128 bears against and rotates with the annular bearing member 126 which is free to slide on its support member 123 so as not to transmit driving torque. On actuation the electro-magnetic coil generates a magnetic flux path attracting the pulley halves together in a belt engaging position whereby torque is transmitted through the pulley half 114 to an output drive shaft. The incline surfaces 170 and 172 are provided to minimize the air gap to the maximum extent possible. The axial spacing between pulley halves will be designed a distance X to insure free running the belt 128 in the disengaged position. However, by inclining the surfaces 170 and 172 from the vertical the magnetic flux is only required to jump the distance Y normal to the surfaces. The distance Y will be less than the distance X by the cosine of the angle of inclination of the surfaces 170 and 172 and thus will be less than the minimum axial spacing required between pulley halves. It will be further observed that in the FIGURE 2 embodiment the electro-magnetic coil member 158 is mounted in a rotating pulley half thus simplifying the design by eliminating the fixed carrier member 56 and annular disc 44 and 46 of the FIGURE 1 embodiment.

Referring now to the FIGURE 3 embodiment the clutch device there illustrated has many parts in common with the FIGURE 1 embodiment. Those parts structurally or functionally conforming to those described with reference to FIGURE 1 are indicated by 200 series digit numbers having the last two digits conforming to those used in the description of FIGURE 1. The principal distinction in this embodiment resides in the provision of a circumferential recess 270 formed in the radially outer surface of annular bearing member 226 which receives the lower end of V-belt 228 providing a locating groove for the drive belt. Inner bearing race member 222 is slidably mounted on annular projection 200 either by a loose connection or by splines or the like so as to be axially moveable relative to the annular projection member 200. A second annular spring member 231 is interposed between the inner bearing race 222 and the pulley half 214 and cooperates with spring 230 to axially center the bearing when the clutch is in the released position. When the coil 258 is energized moving pulley half 212 axially, drive belt 228 and bearing 224 slide together as a unit permitting belt 228 to come into engagement with the surface 218 and transmit driving torque.

In FIGURE 4 there is shown a still further embodiment for utilizing multiple belt inputs. Similar parts with respect to the FIGURES 1 and 3 embodiments bear the identical last two digit numbers. In this arrangement the pulley is comprised of three axially spaced segments 312, 313 and 314 and intermediate each pair of pulley segments there is disposed a drive belt 327 and 328 respectively.

Pulley segment 313 has a spline connection at 315 with the axially extending annular projection 320 of the pulley half 314. Pulley segment 312 is also splined to pulley segment 314 by means of a rod 334 similar to that previously described. A bearing member 324 forms the base of a V-belt drive groove between pulley segments 313 and 314 while a second bearing member 325 provides a similar base for the drive belt groove pulley segments 312 and 313. Spring 330 urges the parts in their released position.

On actuation of the FIGURE 4 species pulley segment 312 is translated axially to the left wherein it engages belt 327 which in turn forces pulley segment 313 and belt 328 in a clamped engaged position. It will be understood that any number of belts may be similarly added.

Although the present invention has been described in conjunction with specific embodiments, it will be understood that the principles of the invention are capable of general application and that those skilled in the art can be expected to make variations dictated by design requirements. Furthermore, some of the features described with reference to the specific species may without the exercise of invention be readily applied to other of the species. It is intended, therefore, that such deviations and variations as are reasonably expected on the part of those skilled in the art and which incorporate the herein disclosed principles will be included within the scope of the following claims.

We claim:

1. A belt engaging pulley comprising: a rotatable pulley device having first and second relatively axially moveable pulley halves each having a surface forming a side of a drive belt groove, bearing means intermediate said pulley halves, said bearing means having a free rotatable annular member forming the base of said drive belt groove, variable pressure actuating means for selectively moving said pulley halves relative to one another axially in a first belt engaging position and a second belt released position.

2. A belt engaging pulley comprising: a rotatable pulley device having first and second relatively axially moveable pulley halves each having an inclined surface forming a side of a V-belt drive groove, bearing means intermediate said pulley halves, said bearing means having a free rotatable annular member forming the base of said drive belt groove, electro-magnetic means for selectively moving said pulley halves relative to one another axially in a first belt engaging position and a second belt released position in response to an electrical control signal.

3. A belt engaging pulley comprising: a rotatable pulley device having first and second relatively axially moveable pulley halves each having a surface forming a side of a drive belt groove, bearing means intermediate said pulley halves, said bearing means having a free rotatable annular member forming the base of said drive belt groove, spring means intermediate said pulley halves operative to normally bias said pulley halves apart axially in a belt released position, electro-magnetic means operative to apply a magnetic force opposing said spring means when an electrical actuation signal is applied to move said pulley halves together in a belt engaging position.

4. A belt engaging pulley comprising: a rotatable pulley device having first and second separate pulley halves each having a surface forming a side of a drive belt groove, bearing means intermediate said pulley halves, said bearing means having a free rotatable annular member forming the base of said drive belt groove, said first pulley half adapted to be secured to an output drive shaft for transmitting driving torque thereto, one or more axially extending rod members secured to said second pulley half extending slidably through said first pulley half so that said pulley halves are rotatably fixed and relatively moveable in an axial direction, an annular ferrous disc member adjacent said first pulley half and secured to said one or more axially extending rod members, spring means intermediate said pulley halves operative to normally bias said pulley halves axially apart in a belt released position, a fixed carrier member having an annular recess formed therein aligned with said annular ferrous disc member, and an electro-magnetic coil disposed in said annular recess operative on actuation to apply a magnetic force acting on said annular ferrous disc member to move said second pulley half axially in a belt engaged position overcoming the force of said spring means.

5. A belt engaging pulley comprising: a rotatable pulley device having first and second pulley halves relatively moveable in an axial direction, each of said pulley halves having a surface forming a side of a drive belt groove, bearing means intermediate said pulley halves, said bearing means having a free rotatable annular member forming the base of said drive belt groove, said first pulley half adapted to be secured to an output drive shaft for transmitting driving torque thereto, an axially moveable annular ferrous disc member connected to said second pulley half for rotation therewith, a fixed ferrous carrier member having a pair of radially spaced axially extending annular projections forming an annular recess therebetween, an electro-magnetic coil disposed in said annular recess, an axially fixed annular ferrous disc member secured to one of said pulley halves for rotation therewith, said axially fixed annular ferrous disc member disposed intermediate said fixed ferrous carrier member and said axially moveable annular ferrous disc member, said axially fixed annular ferrous spaced closely to said fixed carrier member to provide a minimum width air gap impeding magnetic flux transmission from said electro-magnetic coil, said electro-magnetic coil operative when actuated to generate magnetic flux passing through said carrier member and said ferrous disc member moving said axially moveable ferrous disc member and said second pulley half in a belt engaging direction.

6. A belt engaging pulley as claimed in claim 5 wherein said axially fixed ferrous disc member includes a pair of axially extending annular ridges interfitting with said annular projections formed in said carrier member.

7. A belt engaging pulley comprising: a rotatable pulley device having first and second relatively axially moveable pulley halves each having a surface forming a side of a drive belt groove, bearing means intermediate said pulley halves, said bearing means having a free rotatable annular member forming the base of said drive belt groove, spring means intermediate said pulley halves operative to normally bias said pulley halves apart axially in a belt released position, a recess formed in one of said pulley halves, electro-magnetic coil means disposed in said recess, said pulley halves having closely spaced conforming sides adjacent said recess to provide a minimum air gap impeding flux transmission.

8. A belt engaging pulley as claimed in claim 7 wherein said spaced conforming sides of said pulley halves are angularly inclined with respect to the axial travel direction of said pulley halves to provide a minimum air gap normal to said surfaces.

9. A belt engaging pulley comprising: a rotatable pulley device having a plurality of axially spaced pulley segments having surfaces forming the sides of drive belt grooves, each of said plurality of pulley segments rotatively connected and axially slidable relative to the other of said plurality of pulley segments, a plurality of bearing means arranged between each adjacent pair of said pulley segments, each of said plurality of bearing means having a free rotatable annular member forming the base of its respective drive belt groove, variable pressure actuating means for compressing said plurality of pulley segments in a belt engaging position.

10. A belt engaging pulley comprising: a rotatable pulley device having first and second relatively axially moveable pulley halves each having a surface forming a side of a drive belt groove, bearing means intermediate said pulley halves, said bearing means having a free rotatable annular bearing member forming the base of said drive belt groove, said annular bearing member having a circumferential recess extending around the outer periphery thereof adapted to receive and locate a drive belt, actuating means operative to move said pulley halves axially together in a belt engaging position, said annular bearing member having limited axial movement relative to said pulley halves, and spring means intermediate said pulley halves to apply centering forces to said annular bearing member.

References Cited by the Examiner

UNITED STATES PATENTS

| 2,508,558 | 5/1950 | Wolff | 74—230.24 X |
| 3,066,781 | 12/1962 | Straub | 192—84 |

FOREIGN PATENTS

| 1,078,160 | 5/1954 | France. |

DAVID J. WILLIAMOWSKY, *Primary Examiner.*

L. H. GERIN, *Assistant Examiner.*